United States Patent [19]
O'Dell

[11] Patent Number: 5,850,494
[45] Date of Patent: Dec. 15, 1998

[54] FIBER SEQUENCE AND CLARIFICATION AIDING DEVICE

[76] Inventor: Dennis R. O'Dell, 2924 Downey, Independence, Mo. 64055

[21] Appl. No.: 670,487

[22] Filed: Jun. 27, 1996

[51] Int. Cl.$^6$ ....................................................... G02B 6/36
[52] U.S. Cl. ............................................................. 385/137
[58] Field of Search ................................... 385/134–137, 385/114

[56] References Cited

U.S. PATENT DOCUMENTS

| | | | |
|---|---|---|---|
| 4,529,266 | 7/1985 | Delebecque | 385/137 |
| 4,687,289 | 8/1987 | Desanti | 385/135 |
| 4,753,509 | 6/1988 | Parstorfer | 385/135 |
| 5,138,689 | 8/1992 | Merlo et al. | 385/137 |
| 5,155,787 | 10/1992 | Carpenter et al. | 385/137 |
| 5,222,183 | 6/1993 | Daems et al. | 385/135 |
| 5,222,184 | 6/1993 | Foss | 385/137 |
| 5,278,933 | 1/1994 | Hunsinger et al. | 385/135 |
| 5,311,612 | 5/1994 | Vincent et al. | 385/135 |
| 5,375,185 | 12/1994 | Hermsen et al. | 385/135 |
| 5,471,555 | 11/1995 | Braga et al. | 385/136 |
| 5,546,491 | 8/1996 | Loch | 385/99 |
| 5,566,269 | 10/1996 | Eberle, Jr. et al. | 385/137 |

*Primary Examiner*—John Ngo
*Attorney, Agent, or Firm*—Malin, Haley, DiMaggio & Crosby, P.A.

[57] ABSTRACT

A device is disclosed for safely holding, organizing and sequencing optical fibers by which a connector may be placed on the end of fiber optics cable in a manner that is reliable and efficient. The device passively holding optical fiber strands securely an in an organized manner for preparing connection to the connector. The device includes a support member having a rubber member disposed on a top surface thereof. The rubber member includes a plurality of slits, each of which holding an individual fiber strand or ribbon. A color indicator can also be provided with each slit to indicate the corresponding color strand or ribbon to be disposed within the slit. The device can also include left and right wing member pivotally attached to each end of the support member. The wing members can also include similar rubber members having slits and associated color indicators.

17 Claims, 3 Drawing Sheets

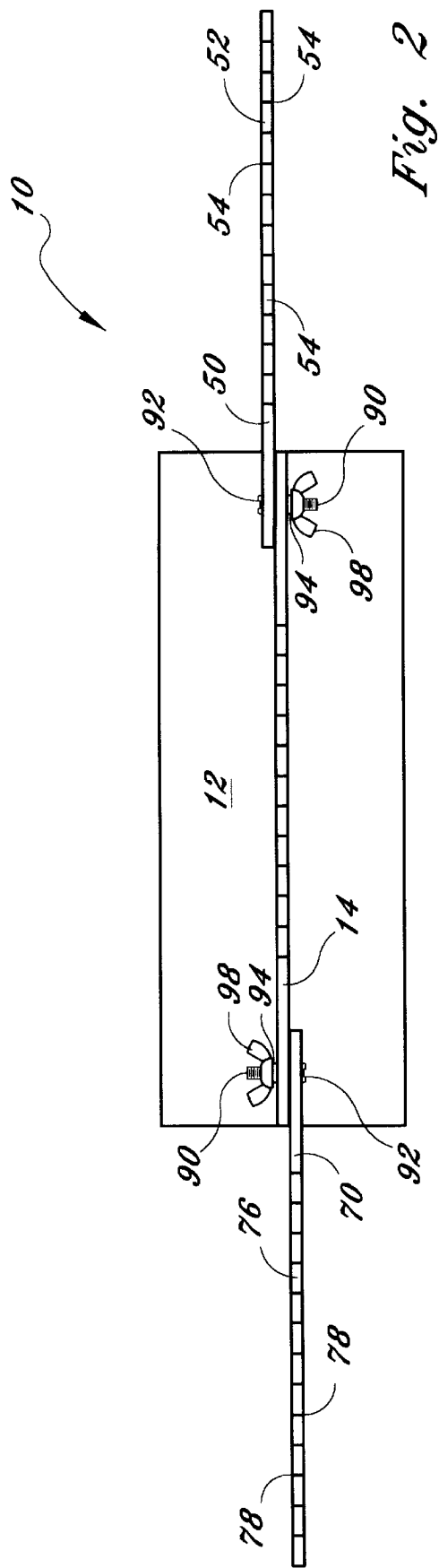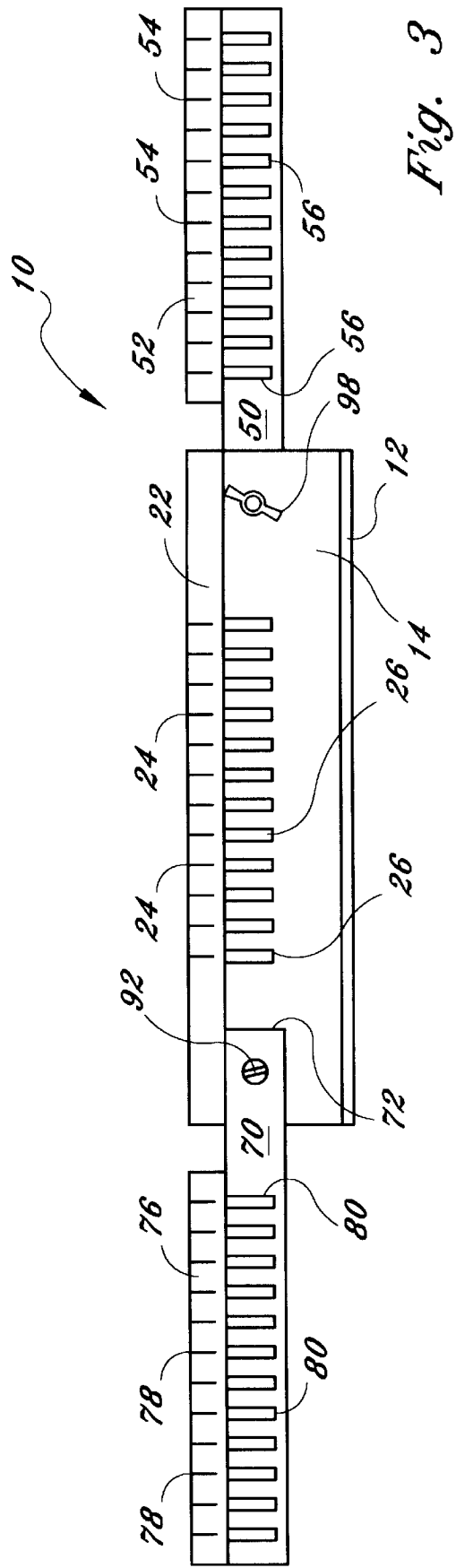

FIBER SEQUENCE AND CLARIFICATION AIDING DEVICE

BACKGROUND OF THE INVENTION

1. Field of the Invention

The present invention relates generally to the field of fiber optics, and more specifically, to an apparatus to be utilized for arranging and maintaining optical fibers in proper order for aiding in the use fiber optics for various end uses, such as for communications equipment.

2. Description of the Prior Art

The use of optical fibers cover an extremely wide range from the purely decorative to the most technical use as a communications medium. Most technical uses of fiber optics use either incoherent or coherent bundles of fibers. In an incoherent light guide there is no relationship between the arrangement of the individual fibers at the two ends of the bundle. With a coherent light guide the fibers in the bundle are arranged so that they have the same relative position at each end of the bundle.

Currently fiber optic connections are performed by taking the optical fibers and laying them flat over a white surface such as a paper towel. This is done because the optical fibers are coated with various colors in order to identify each individual fiber. The fibers are then tested to ensure that the end, which is laid out on the paper towel, is in fact the proper one to be connected. Ultimately the optic fibers, which were spread out over a paper towel, are individually picked up and spliced into whatever is desired for connection.

The laying of the strands over a flat, white surface, typically a paper towel, and individually picking the strands up, testing one at a time and then connecting one at a time presents several disadvantages. Several problems exist with such a method of connection, including, but not limited to: (1) the relatively large amount of time required to locate, test and connect each strand individually; (2) the impossibility of holding strands in place for orderly and time efficient connection; (3) the possibility of not testing each strand; (4) the possible degradation of the optical fiber end while laying on the flat surface; (5) the possibility of the strands breaking, and (6) the possibility of connecting the wrong strand to an end use.

Accordingly, there exists a need in the art for a device which aids in the holding and organizing of fiber optic cable ends. A fiber cable contains a plurality of fiber optic strands which ordinarily must be sequenced at connection in order to operate correctly. Typically multiple fiber tubes are used. Multiple fiber tubes may have 2 to 6 fibers per tube and tubes can be bunched in groups of 240 or more in special applications. Therefore, it is common to have thousands of different fiber optics strands in one fiber optic cable. Therefore, holding and organizing the optic fibers is very important to ensuring timely and proper testing and connection, as well as for providing properly functioning fiber strands.

Optical fibers are prepared for connecting by cutting the cable at an appropriate length, stripping a coating on the cable to reveal a coated-clad-fiber. The fiber is then cleaved with a special cutting tool and the connection is then made. Since optical fibers are very small this operation may require a magnifying device to ensure proper connection. Moreover, fiber optics work on the principle of light transmission and if an end of the optic fiber becomes contaminated it will not function properly. Therefore, it is important to have an effective method to make intricate optic fiber connections without compromising the optic fiber core or end.

As stated above, the fibers are placed on a white surface such as a white paper towel and then picked up individually and placed into a conventional connecting means. The connecting means is utilized for splicing or could also comprise a connection to an end use, such as computer communications equipment. The current process is very time consuming, allow for optic fiber end contamination, as well as possibly contributing to errors in the sequencing of the connection of optical fibers.

The prior art is limited in its ability to aid in the sequencing, sorting and holding of strands to facilitate a connection in an orderly and time efficient manner and are merely provided as splicing aids. Thus, the prior art is severely deficient as an aid to a person engaged in the connection of fiber optics.

U.S. Pat. No. 4,529,266, issued to Delebecque, discloses a device for arraying the ends of Optical fibers spaced out around an axial symmetrical structure. The arraying device comprises a dividing member having openings, through which an optical fiber will pass, and that are extended by channels whose ends are aligned along an axis. This axis defines the layout of the plane where the fibers are to be held in a coplanar and parallel fashion with a view to laying them on the flat holder, generally grooved, of a connecting device for joining the fibers of two linear arrays end-to-end. The Delebecque device requires that the optical fibers are received from the fiber optic cable in an organized manner and is limited to splice connections.

U.S. Pat. No. 4,687,289, issued to DeSanti, discloses a fiber optic splice organizer. The organizer has an elongated body which includes an upwardly open body channel. Strain relief means disposed within the channel secure fiber optic cable in fixed positions relative to the main body. At least one elongated upwardly open fiber tray assembly supported on the main body above the body channel and in longitudinal alignment with the channel provides a closure for an associated portion of the opening at the upper end of the channel and a storage area for loops of optical fiber for use when splice repair is required. The DeSanti device requires that the fiber optics must be arrayed prior to the joining and fails to provide a device for any connection other than a splice.

U.S. Pat. No. 4,753,509, issued to Parstorfer, discloses a receptacle for light waveguide splice connections having adhesive glue gripping means. Zones are coated with an adhesive glue and form a gripping means for holding the light waveguides in a fashion of splice and comb in the guide grooves. These zones are provided in the region of the entry locations for the light waveguides into the slicing plate. Thus, the Parstorfer device requires the use of adhesives to hold the waveguides on the splicing plate.

U.S. Pat. No. 5,222,184, issued to Foss, discloses an optical fiber splice storage tray. The storage tray is provided with a series of ridges, of which alternate ridges are of lesser height than the intervening ridges so that smaller cross-section splices can be disposed as an interference fit between any adjacent pair of the ridges and larger cross-section splices can be disposed as an interference fit between any adjacent pair of the higher ridges. A narrow space or slot is provided between each adjacent pair of ridges at their roots and a wider space or slot between them at a higher level, but below the tops of the lower height ridges. The Foss device is utilized for storage purposes and not as an aid in the sequencing, sorting and holding of strands to facilitate a connection in an orderly and time efficient manner.

Other references that suffer from the limitations discussed above, as well as other limitations, include: (1) U.S. Pat. No.

5,138,689, issued to Merlo et al., disclosing an optical fiber distribution arrangement and method of storing splices using same; (2) U.S. Pat. No. 5,155,787, issued to Carpenter et al., disclosing a multiple optical fiber splice element having ramped porch; (3) U.S. Pat. No. 5,222,183, issued to Daems et al., disclosing a splice case for optical fiber cable; (4) U.S. Pat. No. 5,278,933, issued to Hunsinger et al., discloses a fiber optic splice organizer and associated method; and, (5) U.S. Pat. No. 5,375,185, issued to Hermsen et al., discloses an apparatus for storing and organizing spliced optical fibers.

The prior art provides for devices which are merely permanent storage devices. The prior art devices can not be used as aids in connecting fiber optics as they are not useful in sorting and holding fiber strands to facilitate connection of fiber optics as needed. The prior art devices require that the optic strands be organized and held before use of the prior art device, in order for the prior art device to hold the optic fibers in their already organized state until ultimate use is required. This presents a further limitation in that the prior art cannot be used at any given place or time along the fiber optic cable.

Thus, there exist a need for an optic fiber holder and sequencing device that can be used to make reliable efficient fiber optic connections. Furthermore, there also exist a need for an optic fiber holder and sequencing device that can be used at any point along a fiber optic cable. Additionally, there exist a need for an optic fiber holder and sequencing device that is portable so that it can be brought to the point on a pre-installed fiber optic cable where a connection is desired. It is therefore, to the effective resolution of the aforementioned problems and shortcomings, as well as other problems and shortcomings that may become apparent during the discussion of the present invention, that the present invention is directed.

SUMMARY OF THE INVENTION

The present invention provides an optical fiber organizing, sequencing and holding device. The fiber organizing device includes a support member preferably having a rubber member disposed on a top surface thereof. The rubber member includes a plurality of slits, with each slit provided to hold an individual fiber strand or ribbon. A color indicator means is preferably provided with each slit to easily indicate to a user the proper slit for placing or storing a corresponding color strand or ribbon within. The device also preferably includes left and right wing member pivotally attached to each end of the support member. Each wing member also preferably includes a similar rubber member having slits and associated color indicators as the support member.

The present invention is designed to aid in the sequencing, sorting, organizing and holding of optical fibers in order to facilitate timely and proper connection. The present invention overcomes the limitations of the prior art in that it can be used as an aid for making connections between fiber optics cables and connectors, including but not limited to prior art devices and end uses such as communications equipment. The present invention literally acts as a second pair of hands to a user out in field working with fiber optics.

Accordingly, it is a primary object of the present invention to provide an apparatus to aid in the timely and proper sequenced connection of fiber optics.

It is another object of the invention to allow for holding of sequenced optical fibers in order to ease proper connection.

It is still another object of the invention to provide a cost effective means to sequence and hold optical fibers in order to make sequenced connections.

Other objectives include to provide an apparatus or device that: can be used on a bench top; that can be used in the field at the point of connection; that can be used to store the fibers in an organized and safe manner; that persons engaged in optical fiber connection can easily transport; that can hold a optic fiber without damaging the fiber's optic quality; to provide a holder that will release the optic fiber quickly, and; that holds the optical fibers in a manner that allows for intricate optical fiber preparation and connection, including, but not limited to splicing, routing and/or permanent storage.

In accordance with these and other objects which will become apparent hereinafter, the instant invention will now be described with particular reference to the accompanying drawings.

BRIEF DESCRIPTION OF THE DRAWINGS

The invention may be better understood by reference to the drawings in which:

FIG. 2 illustrates a top view of the fiber sequence and clarification aiding device shown in FIG. 1 with its left and right wing members in their respective open positions;

FIG. 3 illustrates a front view of the fiber sequence and clarification aiding device shown in FIG. 1 with its left and right wing members in their respective open positions;

DESCRIPTION OF THE PREFERRED EMBODIMENTS

Figure 1:
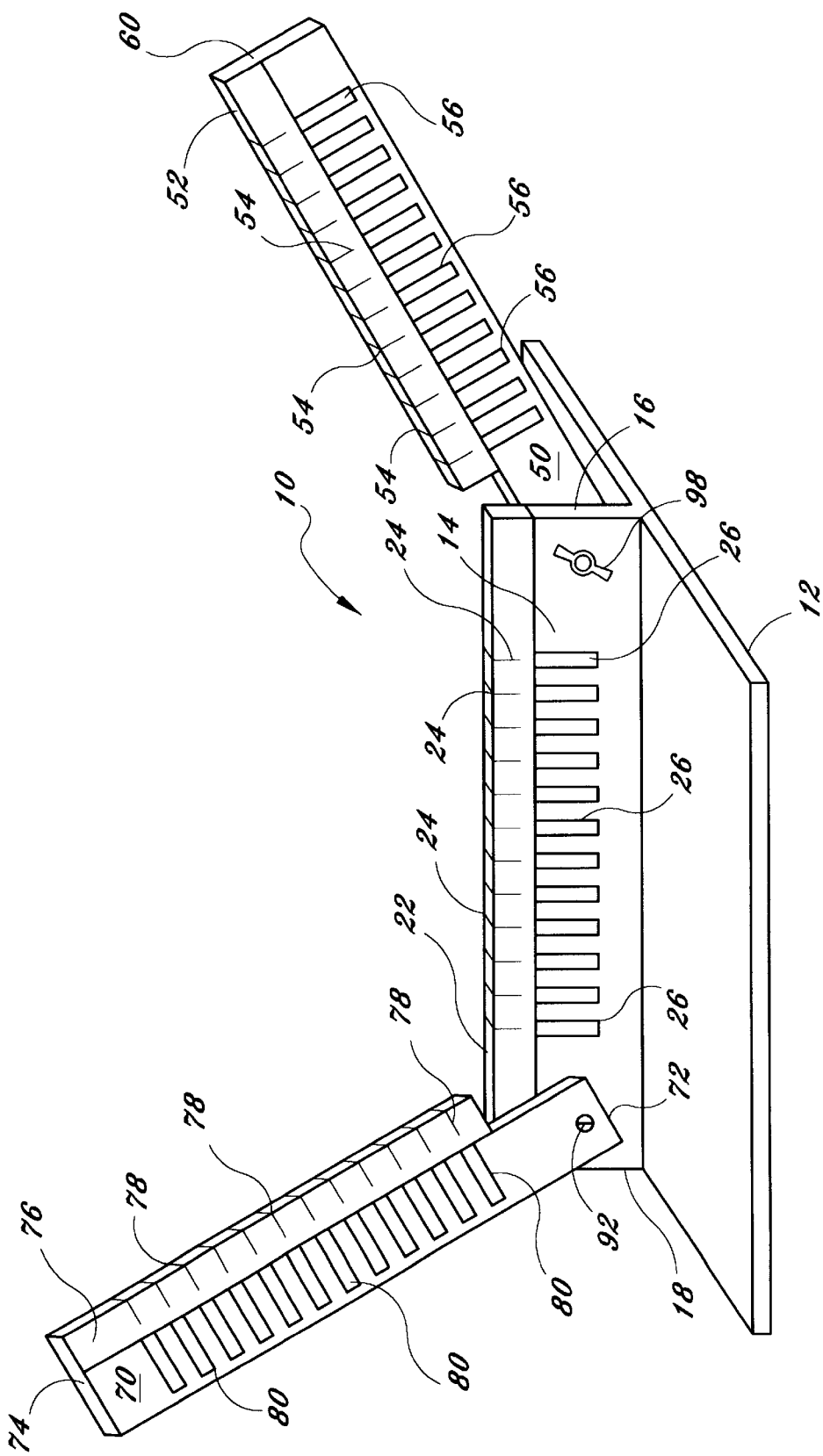
FIG. 1 illustrates a perspective view of a fiber sequence and clarification aiding device in accordance with the present invention.

As seen in drawings, an optical fiber organizing, sequencing and holding device in accordance with the present invention is illustrated and generally referenced as fiber organizing device 10. Fiber organizing device 10 includes a base member 12 having a middle member 14 depending upward therefrom, preferably intermediate the front end and the back end of base member 12.

A fiber receiving member soft rubber member 22 is provided at the top surface of middle member 14. Rubber member 22 is attached to the top surface by conventional means, such as adhesives. However, it should be recognized that other soft materials may be utilized in lieu of a soft rubber and are considered within the scope of the invention. Furthermore, any material capable of gripping and releasing an optic fiber strand or ribbon without causing damage to the optic fiber core can be utilized and is considered within the scope of the invention.

Middle member 14 can be perpendicularly fixed, along one edge, to base plate 12. Forms of fixing middle member 14 to base plate 12 include, but are not limited to, adhesive, bonding, poly-welding or mechanical attachment. However, it is preferred that base member 12 and middle member 14 are constructed integral with each other. This integral construction can be accomplished by molding or casting out of one continuous material.

Preferably, middle member 14 and base member 12 are constructed from of plastic. However, other materials may be utilized and are considered within the scope of the invention such as polypropylene, polyvinylchloride, metal, stainless steel, etc.

Rubber member 22 is provided with a plurality of slots or slits 24 for the receipt of individual fiber optic strands or ribbons. Preferably, slits 24 are centered with respect to the entire length of rubber member. However, enough slits 24 are provided to preferably to extend across a substantial portion of rubber member 22. Each slit 24 facilitates the holding of a respective optical fiber strand or ribbon (not shown). Rubber member 22, in conjunction with slits 24, securely maintains the strands or ribbons in an organized manner, while allowing the ribbons or strands to be easily and safely removed when needed without causing damage to the ribbons or strands.

Color strips 26 can be provided adjacent slits 24. Each color strip will be of a different color as compared to the other color strips 26. The various colors of strips 26 correspond to the various color strands or ribbons. Thus, for example, the slit 24 associated with a red color strip 26 will hold a red colored strand or ribbon. As such, the various ribbons can be quickly and easily separated and organized, as well as being quickly identifiable when needed.

Colored strips 26 can be accomplished by various means such as colored tape, etc. In lieu of strips 26, the area of middle member 14 adjacent each slit 24 can be painted the appropriate color. Preferably, color coded strip 26 are adhesively applied middle member 14 directly below its corresponding slit 24. As stated above, the color coded strips 26 make up a sequencing means for by which corresponding optical fibers are placed in corresponding slit 24. The colors of the sequencing means directly correlate to the typical colors of optic fiber stands found within fiber optic cables.

Figure 4:
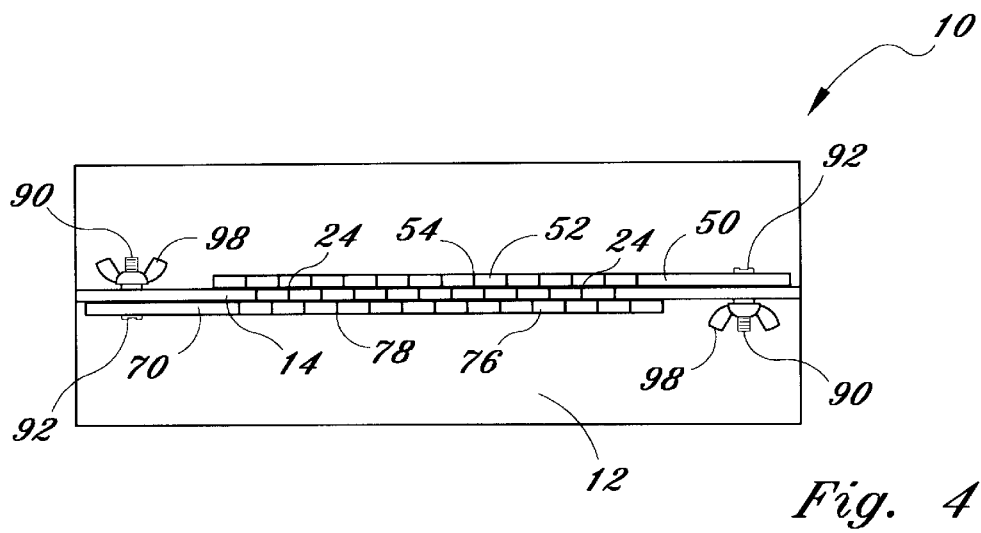
FIG. 4 illustrates a top view of the fiber sequence and clarification aiding device shown in FIG. 1 with its left an right wing members in their respective closed positions.
Figure 5:
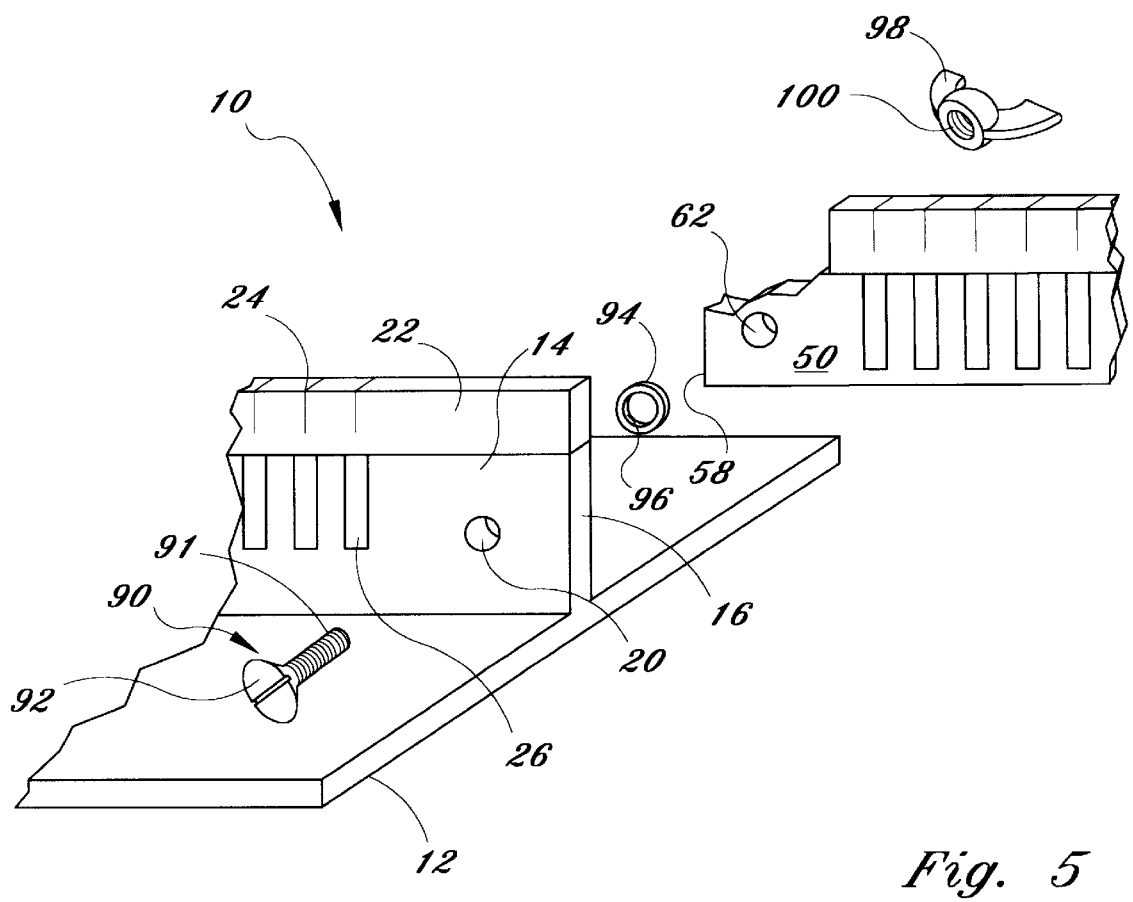
FIG. 5 illustrates an exploded view of a wing member attachment mechanism in accordance with the present invention.

Preferably, fiber organizing device 10 is provided with a right wing member 50 and a left wing member 70, wherein middle member 14 also serves a support member for right wing member 50 and left wing member 70. Middle member 14 is also provided with holes 20, a first hole 20 on its left side and a second hole 20 on its right side (FIG. 5). Holes 20 are provided for attaching right wing member 50 and left wing member 70 to middle member 14. Preferably, wing members 50 and 70 are hingedly connected to middle member, to allow wing members 50 and 70 to be independently positioned anywhere between a fully closed or retracted position (FIG. 4) and a fully open or expanded position (FIGS. 2 and 3).

As seen in FIG. 5, to attach right wing member 50 to middle member 14, hole 62 disposed through wing member 50 near first end 58 of wing member 50 is axially aligned with hole 20 disposed near end 16 of middle member 14. A washer member 94, having an aperture 96, can be disposed between middle member 14 and right wing member 50, such that aperture 96 is aligned with holes 20 and 62. A threaded screw or bolt 90 is inserted through hole 20, aperture 96 and hole 62. A wing nut 98 having a threaded aperture 100 is provided for providing a secure attachment of wing member 50 to middle member 14. Screw 90 is tightened by conventional means, i.e. screwdriver inserted through groove 92 on the screwhead, causing wing nut 98 to travel along shaft member 91 of screw 90 until wing nut 98 is abutting right wing member 50. Though right wing member 50 is securely attached to middle member 14, it is permitted to rotate from its fully retracted position to its fully expanded position, or any position therebetween.

Right wing member 50 is provided with a rubber member 52 having slits 54 which function similar to rubber member 22 and slits 24 associated with middle member 14. Additionally, rubber member 52 is constructed similar to rubber member 22 and is attached to right wing member 50 similar to how rubber member 22 is attached to middle member 14. Furthermore, right wing member 50 can also be provided with color strips 56 which are similar to strips 26 associated with middle member 14. Thus, color coded strips 56 make up a sequencing means for by which corresponding optical fibers are placed in the corresponding slits, with the colors of the sequencing means for right wing member 50 directly correlating to the typical colors of optic fiber stands found within fiber optic cables.

Left wing member 70 is similarly attached to middle member 14 at its opposite end 18, as well as its opposite side. Thus, left wing member 70 is permitted to rotate from its fully retracted position to its fully expanded position, or any position therebetween. Left wing member 70 is provided with a rubber member 76 having slits 78 which also function similar to rubber member 22 and slits 24 associated with middle member 14. Rubber member 76 is also constructed similar to rubber member 22 and is attached to left wing member 70 similar to how rubber member 22 is attached to middle member 14. Furthermore, left wing member 70 can be provided with color strips 80 which are similar to strips 26 associated with middle member 14.

Wing members 50 and 70 are preferably constructed from a plastic material. However, like middle member 14 other materials may be utilized and are considered within the scope of the invention. Slits 24, 54 and 80 are preferably spaced apart from adjacent slits 24, 54 and 80, respectively, approximately ⅜", such that fibers disposed within the slits do not interfere with each other. Additionally, each slit 24, 54 and/or 80 is preferably approximately ⅝" deep to assure that a disposed fiber does not inadvertently escape from slit 24, 54 or 80. It should be understood that the preferred slit spacing distance and the preferred slit depth distance are not limiting, and other distances which provide adequate spacing and depth can be utilized and are considered within the scope of the invention.

Typically optic fibers (not shown) are comprised of sub groups of twelve different colored optic fibers. In the preferred embodiment of the present invention the sequencing means of middle support member 14, left wing member 70 and right wing member 50 each contain twelve slits 24, 78 and 54, respectively, with corresponding color coded adhesive strips 26, 80 and 56, respectively. Therefore, the combination of sequencing means of wing support middle member 14, left wing member 18 and right wing member 20 allow for three separate groupings of optic fibers to be sorted, organized and safely held.

In their fully open position (FIGS. 2 and 3) left wing member 70 and right wing member 50 extend outward from ends 18 and 16, respectively, of middle member 14. In the fully closed or transporting position (FIG. 4), left wing member 70 and right wing member 50 are rotated until rubber members 52 and 76 are in contact with base plate 12. Wing members 50 and 70 can be positioned in their closed position, even while fibers or strands are disposed within slits 54 and/or 80. Thus, optical fiber organizing aid 20 is in it's most compact form while in the closed position which is the optimal position for storing or transporting purposes.

When in use one or both of wing members 50 and 70 are expanded out into a working position as needed. Fibers are currently worked on one at time. The instant invention makes it possible to prep groups of fibers at a time for splicing purposes. The present invention creates order where previously there was disorder, as well as establishing clarity where before there was confusion. The present invention can be utilized to cut cables to establish fiber sequence prior to splicing and storage. The present invention can also be utilized on new work to safely hold and arrange fibers being prepared for termination in an office or terminal.

The present invention increases man-hour performance by eliminating errors, removing doubts, and literally acting as a second "pair of hands".

In one use, a 2600 splice closure is disposed on top of support member 14, left wing member 70 is utilized for holding and organizing office fibers coming from a first cable and right wing member 50 is utilized for holding and organizing field fibers coming from a second cable.

The instant invention has been shown and described herein in what is considered to be the most practical and preferred embodiment. It is recognized, however, that departures may be made therefrom within the scope of the invention and that obvious modifications will occur to a person skilled in the art. For example, other conventional or equivalent correlating or associating means, such as a series of number designations, which would be obvious to one skilled in the art, can be substituted for or provided in addition to color coded strips 26.

What I claim is:

1. An optic fiber sequence and holding device for safely holding and organizing one or more fiber members, comprising:

a support member;

means for holding the fiber members in a safe and organized manner, said means for holding is a flexible member disposed upon a top surface of said support member, said flexible member having one or more slit members, each slit member provided for receipt of an individual fiber member; and means for associating a specific fiber member with a specific slit member.

2. The optic fiber sequence and holding device of claim 1 wherein said flexible member is constructed from a soft rubber to prevent damage to any fiber member disposed within said slit members.

3. The optic fiber sequence and holding device of claim 1 wherein said means for associating are a plurality of color strips, each of said plurality of color strips disposed on said support member adjacent an associated slit member, each of said plurality of color strips corresponding to a like color fiber member, wherein each color fiber member is disposed within a respective slit member associated with the similar color strip.

4. The optic fiber sequence and holding device of claim 3 wherein said means for associating further includes a series of number designations, each of said number designations associated with a specific color strip and corresponding to a specific slit member.

5. The optic fiber sequence and holding device of claim 1 further including a first wing member associated with a first end of said support member and a second wing member associated with a second end of said support member, each of said wing members also including means for holding the fiber members in a safe and organized manner.

6. The optic fiber sequence and holding device of claim 1 wherein said means for associating are a series of number designations, each of said number designations corresponding to a specific slit member.

7. An optic fiber sequence and holding device for safely holding and organizing one or more fiber members, comprising:

a support member;

means for holding the fiber members in a safe and organized manner;

a first wing member associated with a first end of said support member and a second wing member associated with a second end of said support member, each of said wing members also including means for holding the fiber members in a safe and organized manner;

wherein said wing members are pivotally attached to respective ends of said support member to allow said wing members to be each independently rotated from a fully open position to a fully closed position and anywhere in between.

8. The optic fiber sequence and holding device of claim 7 further including a plurality of color strips, a first set of said color strips disposed on said support member, each of said plurality of color strips from said first set disposed adjacent an associated slit member, each of said plurality of color strips from said first set corresponding to a like color fiber member, a second set of said color strips disposed on said first wing member, each of said plurality of color strips from said second set disposed adjacent an associated slit member, each of said plurality of color strips from said second set corresponding to a like color fiber member, a third set of said color strips disposed on said second wing member, each of said plurality of color strips from said third set disposed adjacent an associated slit member, each of said plurality of color strips from said third set corresponding to a like color fiber member, wherein each color fiber member is disposed within a respective slit member associated with the similar color strip of either said first set, said second set or said third set.

9. The optic fiber sequence and holding device of claim 8 further including a first series of number designations associated with said first set of color strips, a second series of number designations associated with said second set of color strips, and a third series of number designation associated with said third set of color strips.

10. An optic fiber sequence and holding device for safely holding and organizing one or more fiber members, comprising:

a support member having a top surface;

a first flexible member disposed upon the top surface of said support member, said flexible member having a plurality of slit members, each slit member provided for receipt of an individual fiber member;

a first wing member pivotally attached to a first end of said support member, said first wing member having a top surface;

a second flexible member disposed upon the top surface of said first wing member, said second flexible member having a plurality of slit members, each slit member of said second flexible member provided for receipt of an individual fiber member;

a second wing member pivotally attached to a second end of said support member, said second wing member having a top surface; and a third flexible member disposed upon the top surface of said second wing member, said third flexible member having a plurality of slit members, each slit member of said third flexible member provided for receipt of an individual fiber member;

wherein said flexible members hold the fiber members in a safe and organize manner;

wherein said wing members can be each independently rotated from a fully open position to a fully closed position and anywhere in between.

11. The optic fiber sequence and holding device of claim 10 wherein said flexible members are constructed from a soft rubber to prevent damage to any fiber member disposed within respective slit members.

12. The optic fiber sequence and holding device of claim 10 further including means for associating a specific fiber member with a specific slit member.

13. The optic fiber sequence and holding device of claim 12 wherein said means for associating are a plurality of color strips, a first set of said color strips disposed on said support member, each of said plurality of color strips from said first set disposed adjacent an associated slit member, each of said plurality of color strips from said first set corresponding to a like color fiber member, a second set of said color strips disposed on said first wing member, each of said plurality of color strips from said second set disposed adjacent an associated slit member, each of said plurality of color strips from said second set corresponding to a like color fiber member, a third set of said color strips disposed on said second wing member, each of said plurality of color strips from said third set disposed adjacent an associated slit member, each of said plurality of color strips from said third set corresponding to a like color fiber member, wherein each color fiber member is disposed within a respective slit member associated with the similar color strip of either said first set, said second set or said third set.

14. The optic fiber sequence and holding device of claim 13 wherein said means for associating further includes a series of number designations, each of said number designations associated with a specific color strip and corresponding to a specific slit member.

15. The optic fiber sequence and holding device of claim 12 wherein said means for associating are a series of number designations, each of said number designations corresponding to a specific slit member.

16. An optic fiber sequence and holding device for safely holding and organizing one or more fiber members, comprising:
   a support member;
   a first wing member associated with said support member, said first wing member including means for holding the fiber members in a safe and organized manner, said first wing member attached to said support member;
   a second wing member associated with said support member, said second wing member also including means for holding the fiber members in a safe and organized manner, said second wing member attached to support member;
   wherein said wing members are pivotally attached to respective ends of said support member to allow said wing members to be each independently rotated from a fully open position to a fully closed position and anywhere in between.

17. The optic fiber sequence and holding device of claim 16 wherein said support member including means for holding the fiber members in a safe and organized manner.

* * * * *